United States Patent [19]

Sher et al.

[11] Patent Number: 4,870,653
[45] Date of Patent: Sep. 26, 1989

[54] TRAVELING-WAVE LASER-PRODUCED-PLASMA ENERGY SOURCE FOR PHOTOIONIZATION LASER PUMPING AND LASERS INCORPORATING SAID

[75] Inventors: Mark H. Sher, Los Altos; John J. Macklin, Stanford; Stephen E. Harris, Palo Alto, all of Calif.

[73] Assignee: The Board of Trustees of the Leland Stanford Junior University, Stanford, Calif.

[21] Appl. No.: 184,622

[22] Filed: Apr. 22, 1988

[51] Int. Cl.$^4$ ............................................... H01S 3/09
[52] U.S. Cl. ........................................ 372/76; 372/84; 372/5; 372/73
[58] Field of Search ........................... 372/5, 73, 76, 84

[56] References Cited

U.S. PATENT DOCUMENTS

| | | | |
|---|---|---|---|
| 3,864,643 | 2/1975 | Waynat | 372/5 |
| 4,229,708 | 10/1980 | Mani et al. | 372/5 |
| 4,592,064 | 5/1986 | Silfvast | 372/5 |

OTHER PUBLICATIONS

Sher et al.; "Saturation of XeIII 109-nm Laser using traveling-wave laser-produced-plasma excitation", Opt. Lett. vol. 22 No. 11, vol. 12, p. 891 Nov. 1987.

H. C. Kapteyn, R. W. Lee and R. W. Falcone, Phys. Rev. Lett. 57,2939 (1986).

H. C. Kapteyn, M. M. Murnane, R. W. Falcone, G. Kolbe and R. W. Lee, Proc. Soc. Photo-Opt. Instrum. Eng. 688, 54 (1986).

M. A. Duguay, in "Laser Induced Fusion and X-Ray Laser Studies", S. F. Jacobs, M. O. Scully, M. Sargent III and C. D. Cantrell III, eds. (Addison-Wesley, Reading, Mass., (1976), p. 557.

*Primary Examiner*—Leon Scott, Jr.
*Attorney, Agent, or Firm*—Flehr, Hohbach, Test, Albritton & Herbert

[57] ABSTRACT

A traveling-wave, laser-produced-plasma, energy source used to obtain single-pass gain saturation of a photoionization pumped laser. A cylindrical lens is used to focus a pump laser beam to a long line on a target. Grooves are cut in the target to present a surface near normal to the incident beam and to reduce the area, and hence increase the intensity and efficiency, of plasma formation.

13 Claims, 2 Drawing Sheets

TRAVELING-WAVE LASER-PRODUCED-PLASMA ENERGY SOURCE FOR PHOTOIONIZATION LASER PUMPING AND LASERS INCORPORATING SAID

This invention was made with United States Government support under Air Force Agreement F49620-85-C-0101, Navy Agreement N00014-87-K-0265/N00014-86-C-2361 and LLL Subcontract No. 3997405 (under DOE Prime) DOE Case No. S-67, 529 (RL-10352). The Government has certain rights in this invention.

This invention relates generally to photoionization pumped lasers and more particularly to a laser pumped by energy emitted from a laser produced traveling-wave plasma and to a traveling-wave laser-produced plasma energy source.

Short wavelength laser systems pumped by photoionization are well known. As shown in FIG. 1, soft X-rays cause photoionization of an inner shell $4d$ electron from neutral Xenon, XeI. The resulting ion, Xe II, rapidly undergoes Auger decay producing various excited states, Xe III. The Auger branching ratio is about 5% to both the upper and lower levels. Gain is observed at the transition wavelength of 108.9 nm.

Proposals for photoionization pumping of short-wavelength lasers and for Auger-pumped short-wavelength lasers were made by M. A. Duguay, in "Laser Induced Fusion and X-Ray Laser Studies", Addison-Wesley, Reading, Mass., 1976), p. 557, and by McGuire, Phys. Rev. Lett 35,844 (1975). The possibility of constructing such lasers at low pumping energies was delineated by the work of Caro et al., Appl. Phys. Lett. 42,9 (1983), Silfvast et al., Opt. Lett. 8,551 (1983), and Mendelsohn and Harris, Opt. Lett. 10,128 (1985). Recently Yin et al., Opt. Lett. 12,331 (1987), showed that small-signal gain coefficients within a factor of 2 of those reported here could be produced with several joules (J) of pump energy and, in addition, that the Xe III 108.9 nm gain can be limited by competing processes. Their work suggests that the most efficient use of pump energy requires a long, high-aspect-ratio geometry.

Duguay suggests the use of a laser beam at large angles of incidence to produce traveling X-rays required for traveling wave pumping of a copper X-ray laser. However, there is a substantial loss of energy by reflection because of the grazing incidence of the laser beam. Non-traveling wave laser-produced plasma excitation sources using normal incidence arrangements have been described in the prior art. H. C. Kapteyn, R. W. Lee and R. W. Falcone, Phys. Rev. Lett. 57,2939 (1986) and Yin et al. above.

In the normal incidence pumping arrangements there is a short length line focus of the laser energy on the target equal to the beam diameter for generating the pumping plasma and soft X-rays contrasted to the grazing incidence arrangement which increases the line length but decreases the intensity of the incident energy. The pump laser power density must be maintained at the necessary minimum value to provide soft X-rays for photoionization.

It is a general object of the present invention to provide an improved extreme ultraviolet (XuV) and soft X-ray laser.

It is another object of the present invention to provide a traveling wave laser produced plasma soft X-ray source for photoionization laser pumping.

It is a further object of the present invention to provide a laser produced plasma soft X-ray source which is distributed over a relatively long length while the laser power density is maintained at the necessary value for efficient production of plasma soft X-rays.

The foregoing and other objects of the invention are achieved by obliquely directing a laser beam through a lens which focuses the laser beam to a line on a metal target which has spaced beam intercepting surfaces disposed at an acute angle with respect to the beam to form a plurality of spaced X-ray emitting plasmas one on each of the beam intercepting surfaces. It is believed that heavy metal targets (gold, tantalum, etc.) provide the best conversion into the X-rays useful for photoionization pumped lasers. A laser is formed by disposing a lasing medium to be photoionized by X-rays emitted by said plasmas.

The invention will be more clearly understood from the following description taken in conjunction with the accompanying drawings of which:

Figure 1:
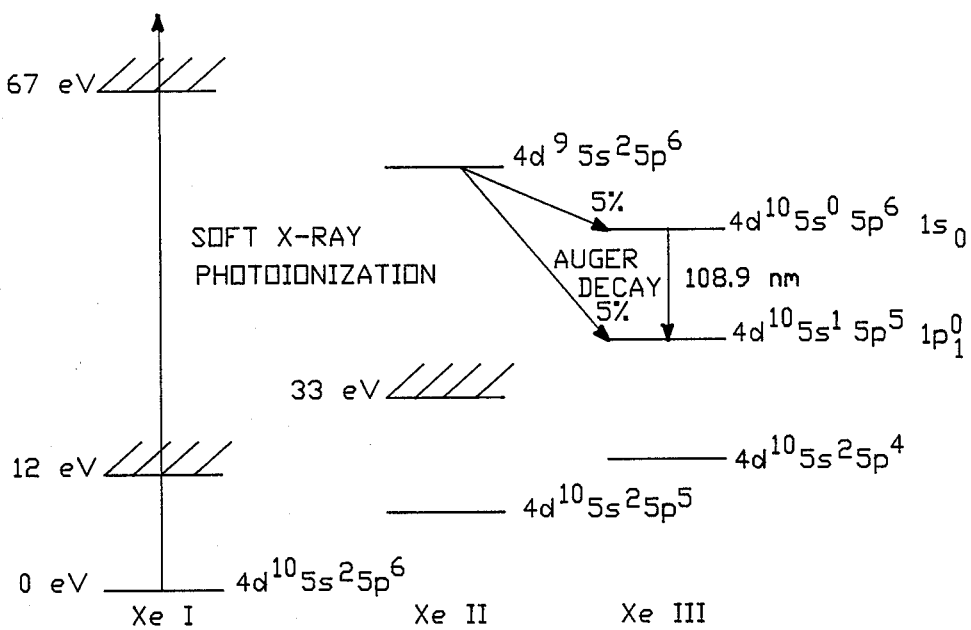
FIG. 1 is the energy level diagram of Xenon showing levels relevant to photoionization and to Auger pumping.
Figure 2:
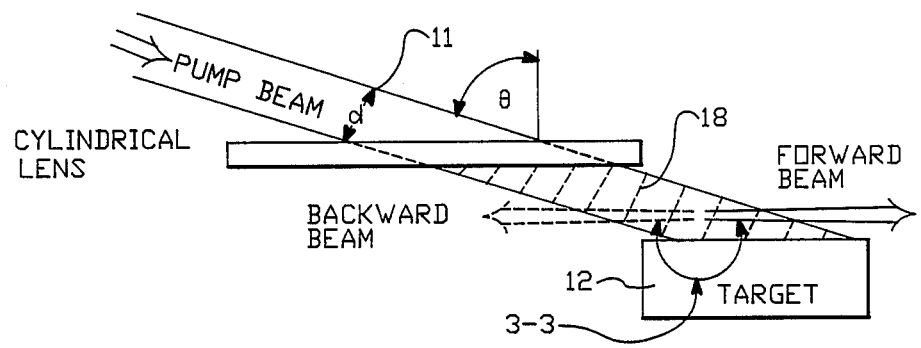
FIG. 2 is a diagram of a Xenon laser employing a traveling-wave laser-produced-plasma soft X-ray source for photoionization.

Referring to FIG. 2, a high power pump laser beam 11 is obliquely incident upon a metal target 12 at an angle $\theta$. A cylindrical lens intercepts the beam and focuses the laser beam to a line focus on the surface of the target. In accordance with the present invention, the surface of the metal target upon which the beam is focused is provided with spaced beam intercepting surfaces which are near normal to the beam.

Figure 3:
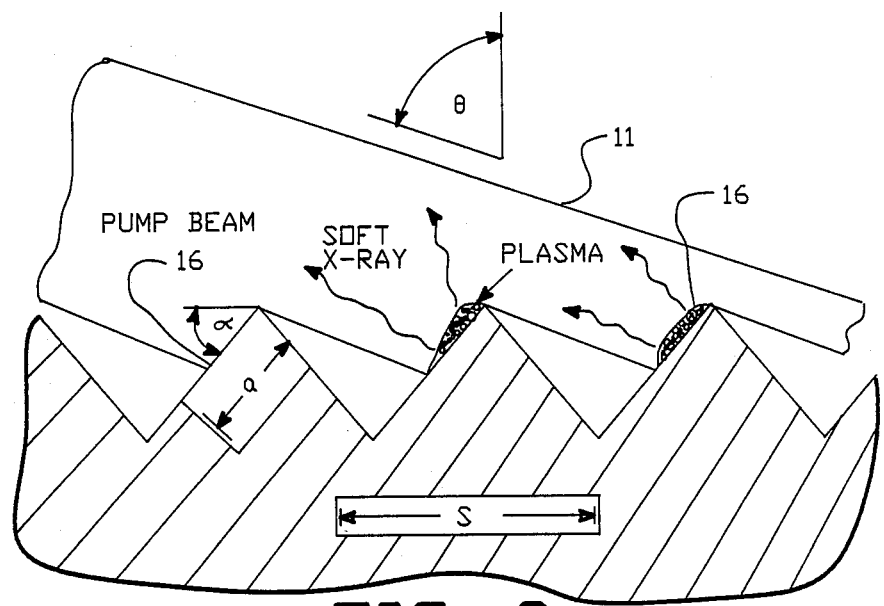
FIG. 3 is an enlarged view of the portion 3—3 of FIG. 2.

One way of forming such surfaces is to cut grooves 14 in the metal as shown in FIG. 3 which is an enlarged section of a portion of FIG. 2. Thus, the beam strikes the spaced surfaces 16 to form a plurality of small separate plasmas which emit soft X-rays rather than a continuous line plasma as would occur with a smooth target surface. The combined length of the plasmas is only slightly greater than the pump laser beam diameter. The grooves are cut into the target to form an angle with respect to the plane of the target, $\alpha$, and spacing, S. The angle of incidence is $\theta$-$\alpha$. Thus, the beam strikes the surfaces at near normal to provide high power density and improved soft X-ray conversion efficiency.

This oblique focusing geometry has several advantages over the normal incidence used in the past. The length of the soft X-ray-pumped region, is increased by the factor $1/\cos\theta$. The length of each plasma is $$a = s \frac{\cos\theta}{\cos(\theta - \alpha)}.$$

The total length of all, $$\frac{L}{S}$$

plasmas is $$\frac{d}{\cos(\theta - \alpha)}$$

which is near equal to the diameter, d, of the pump laser beam for angles of $\theta-\alpha$ of less than 25°. The combination of the oblique angle of incidence of the laser beam and grooved target allows the length of the soft X-ray source, and hence the XuV laser, to be extended to many times the beam diameter while maintaining constant pump laser intensity on the target and hence, constant conversion efficiency.

The pump laser is pulsed and the phase fronts 18 sweep across the target at a speed $c/\sin\theta$, where c is the speed of light. Thus, the emitted soft X-rays travel at the same speed as the effective phase front of the plasma to provide nearly synchronous traveling-wave excitation of the ambient gaseous lasing medium.

Figure 4A:
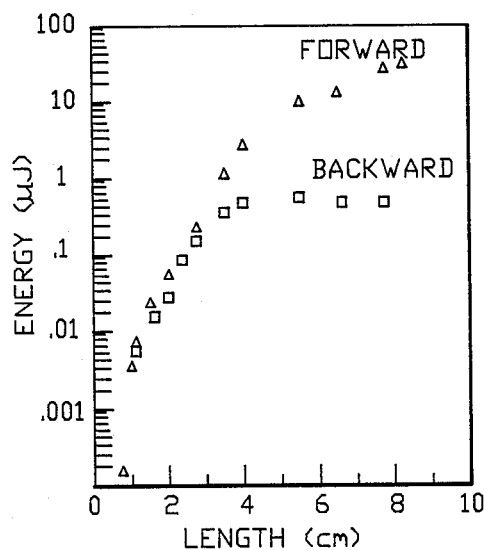
FIG. 4A shows energy versus plasma length on a log scale illustrating the initial exponential growth of the laser emission.
Figure 4B:
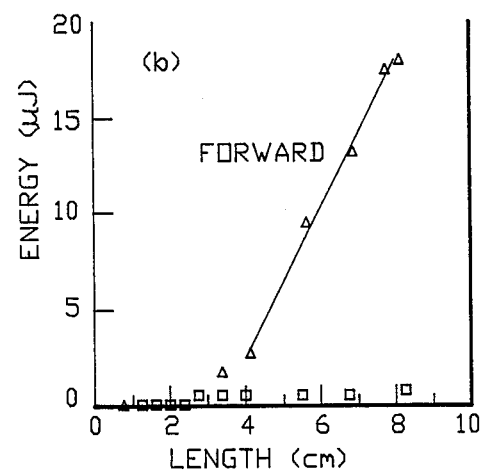
FIG. 4B shows energy versus plasma length on a linear scale illustrating saturated linear growth of the forward XuV laser beam.

In one example, the angle of incidence $\theta$ of the laser beam was 68° and was focused onto the target with a focal line width of 200 $\mu$m and 9 cm in length. The angle $\alpha$ was 45° and the angle $\theta-\alpha$ was therefore 23°. The target was as stainless steel rod threaded with 19 grooves per centimeter and electro-plated with gold. The ambient lasing medium was Xenon at a pressure of 4 Torr. In this example the intensity on the target was $2\times10^{11}$ W/cm$^2$. The large signal behavior of both the forward and backward 108.9 XuV laser emission is shown in the semi-log and linear plots of FIGS. 4A and 4B where each symbol represents the average of at least 3 data points. For short lengths, the slope of the forward and backward energy versus length are approximately the same. Beyond 4 cm of length, the forward beam grows linearly while the backward wave remains constant. This behavior indicates that the forward beam is fully saturated and is extracting all the stored energy. The maximum energy output was 20 $\mu$J in the forward direction and 0.4 $\mu$J in the backward direction yielding a forward-to-backward emission ratio of 50:1.

The pump laser in this case was a 1064 nm Nd:YAG and Nd:Glass laser. However, any reasonably high power laser that will make a plasma can be used. Possibilities are: Nd:YAG lasers, Nd:Glass lasers, CO$_2$ lasers, Excimer lasers, Nitrogen lasers, Iodine lasers, etc., or any harmonics generated from the fundamental wavelengths of these lasers. Shorter wavelengths generally produce higher conversion efficiencies to emitted X-rays. For example: 2nd harmonic (532 nm) of Nd:YAG or Nd:Glass (1.06$\mu$) will probably make a more efficient plasma than the fundamental.

The cylindrical lens described is only one example of an optical device which might create the desired line focus. Other possibilities are: a cylindrical mirror (identical properties to cylindrical lens); combinations of cylindrical lenses and mirrors; specialized, aspheric, variable focal length lenses or mirrors; and, combinations of these with diffraction or transmission gratings.

Although the invention was described in connection with a photoionization pumped Xenon laser, the invention is useful in connection with other types of photoionization pumped lasers such as direct pumped lasers (as proposed by Duguay), Auger lasers, cascade Auger lasers, multi-excitation or "shake-up" lasers and Metastable or Quasimetastable "store and transfer" lasers. Another type of laser where traveling-wave pumping can be used is a photodissociation laser.

Thus, there has been provided single-pass gain saturation of a photoionization-pumped laser by a traveling-wave laser-induced plasma emitted X-rays that efficiently excites an extended gain length using only a few joules of pump energy. This is a significant step in the development of photoionization-pumped lasers.

We claim:

1. A traveling-wave energy source comprising:
   a target having a plurality of spaced energy absorbing energy emitting surfaces on the surface of the target,
   a pulsed pump laser producing a beam of pulsed energy, means for focusing said beam at an oblique angle with respect to said surfaces,
   said spaced surfaces being positioned and shaped on said target surface to form an angle with respect to said surface so that surface intercepts in sequence a portion of said pulsed laser pump energy thereby forming a plasma at each of said plurality of surfaces, said plasma emitting in sequence energy at each of said spaced surfaces to provide a traveling wave of energy.

2. A traveling-wave energy source as in claim 1 in which said spaced surfaces are positioned to intercept said pulses of laser energy at near normal incidence.

3. A traveling-wave energy source as in claims 1 or 2 in which said energy is soft X-rays.

4. A traveling-wave energy source as in claims 1 or 2 including optical means for focusing said laser beam on a line on said target.

5. A traveling-wave soft X-ray source as in claim 4 wherein said optical means comprises a cylindrical lens.

6. A traveling-wave energy source as in claims 1 or 2 in which said spaced beam intercepting surfaces are each one surface of a groove.

7. A traveling-wave soft X-ray source as in claims 1, or 2 wherein said laser is a high power pump laser.

8. A laser including:
   a target having a surface including a plurality of energy absorbing energy emitting surfaces,
   a pulsed laser means for producing a pulsed pump beam at an oblique angle with respect to said said plurality of spaced surfaces,
   said spaced surfaces positioned and shaped to form an angle with respect to said surface so that each surface of said surfaces intercepts a portion of said pulsed beam whereby said pump laser energy sequentially forms a plasma at each surface as each laser pulse sequentially strikes said surfaces, said plasmas sequentially emit soft X-ray energy at each of said spaced surfaces to form a traveling wave of emitted X-rays,
   a lasing medium disposed to be excited by said traveling wave of X-ray energy to produce laser action.

9. A laser as in claim 8 in which the lasing medium is excited by photoionization.

10. A laser as in claims 8 or 9 in which said spaced surfaces are positioned to intercept said laser beam at near normal incidence.

11. A laser as in claim 10 in which said spaced beam interrupting surfaces are formed by grooving said target.

12. A laser as in claim 8 including optical means for focusing said laser beam on a line on said target.

13. A laser as in claim 12 wherein said optical means comprises a cylindrical lens.

* * * * *